United States Patent [19]
Zollinger et al.

[11] Patent Number: 5,375,530
[45] Date of Patent: Dec. 27, 1994

[54] PIPE CRAWLER WITH STABILIZING MIDSECTION

[75] Inventors: William T. Zollinger, Martinez; Richard C. Treanor, Augusta, both of Ga.

[73] Assignee: The United States of America as represented by the Department of Energy, Washington, D.C.

[21] Appl. No.: 123,942

[22] Filed: Sep. 20, 1993

[51] Int. Cl.$^5$ .............................................. B61B 13/10
[52] U.S. Cl. ................................ 104/138.2; 104/138.1
[58] Field of Search ........................... 104/138.1, 138.2

[56] References Cited

U.S. PATENT DOCUMENTS

| | | | |
|---|---|---|---|
| 3,495,546 | 2/1970 | Brown et al. | 104/155 |
| 3,758,050 | 9/1973 | Watts et al. | 243/32 |
| 4,131,018 | 12/1978 | Muller et al. | 73/432 |
| 4,369,713 | 1/1983 | Richardson | 104/138 |
| 4,460,920 | 7/1984 | Weber et al. | 358/100 |
| 4,581,938 | 4/1986 | Wentzell | 73/623 |
| 4,838,170 | 6/1989 | Illakowicz | 104/138.2 |
| 5,018,451 | 5/1991 | Hapstack | 104/138.2 |
| 5,121,694 | 6/1992 | Zollinger | 104/138.2 |
| 5,142,989 | 9/1992 | Suzumori et al. | 104/138.2 |
| 5,172,639 | 12/1992 | Wiesman et al. | 104/138.2 |
| 5,195,392 | 3/1993 | Moore et al. | 73/866.5 |
| 5,272,986 | 12/1993 | Smart | 104/138.2 |

FOREIGN PATENT DOCUMENTS 60875  3/1990  Japan ............................ 104/138.2

Primary Examiner—Douglas C. Butler
Assistant Examiner—S. Joseph Morano
Attorney, Agent, or Firm—Brian R. Tumm; Harold N. Dixon; William R. Moser

[57] ABSTRACT

A pipe crawler having a midsection that provides the stability and flexibility to allow the pipe crawler to negotiate curved and uneven segments of piping while traveling through piping systems. The pipe crawler comprises a front leg assembly, a rear leg assembly, a midsection with a gimbal at each end for connecting the midsection to the front and rear leg assemblies in a flexible manner, and an air cylinder for changing the distance between the front and rear leg assemblies. The pipe crawler moves in "inch worm" fashion with the front and rear leg assemblies alternating between an extended and a retracted position as the air cylinder moves the retracted leg assembly forward. The midsection has a plurality of legs extending radially for holding the midsection within a maximum displacement from the piping axis so that the gimbals are not pivoted to extreme angles where they might lock up or seize. When the midsection is displaced sufficiently, its legs with wheels on each end engage the interior surface of the piping and prevent further displacement. Using two gimbals divides the angle between the planes defined by the front and rear leg assemblies which also helps to prevent excessive gimbal pivoting.

20 Claims, 3 Drawing Sheets

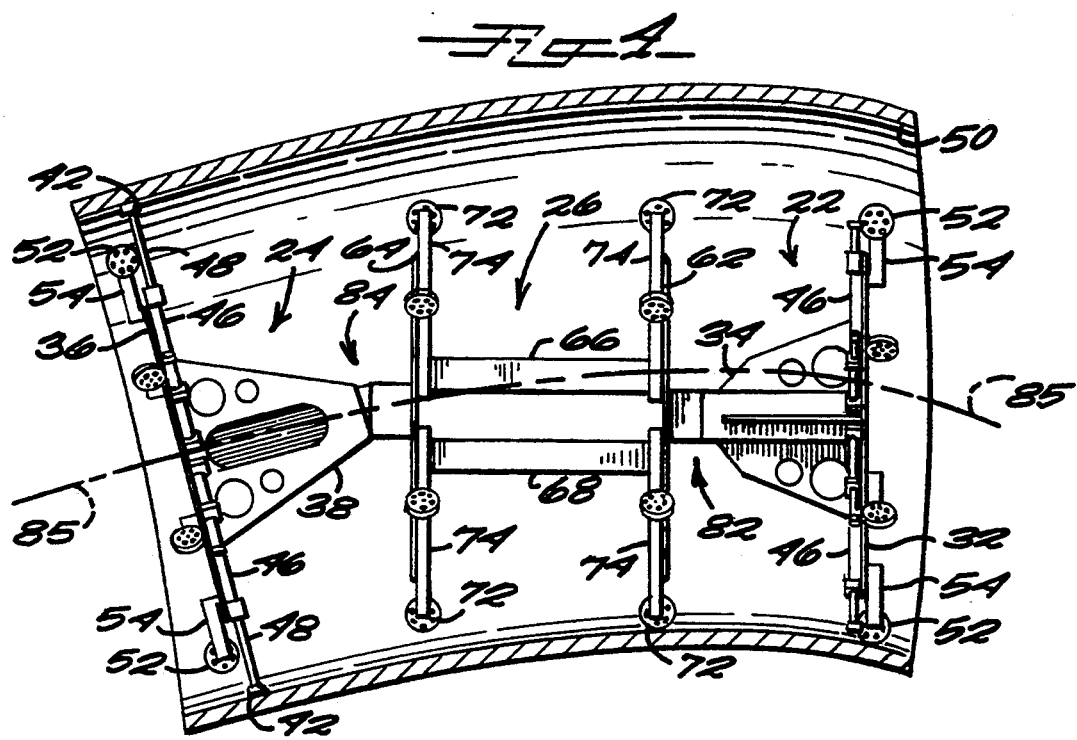
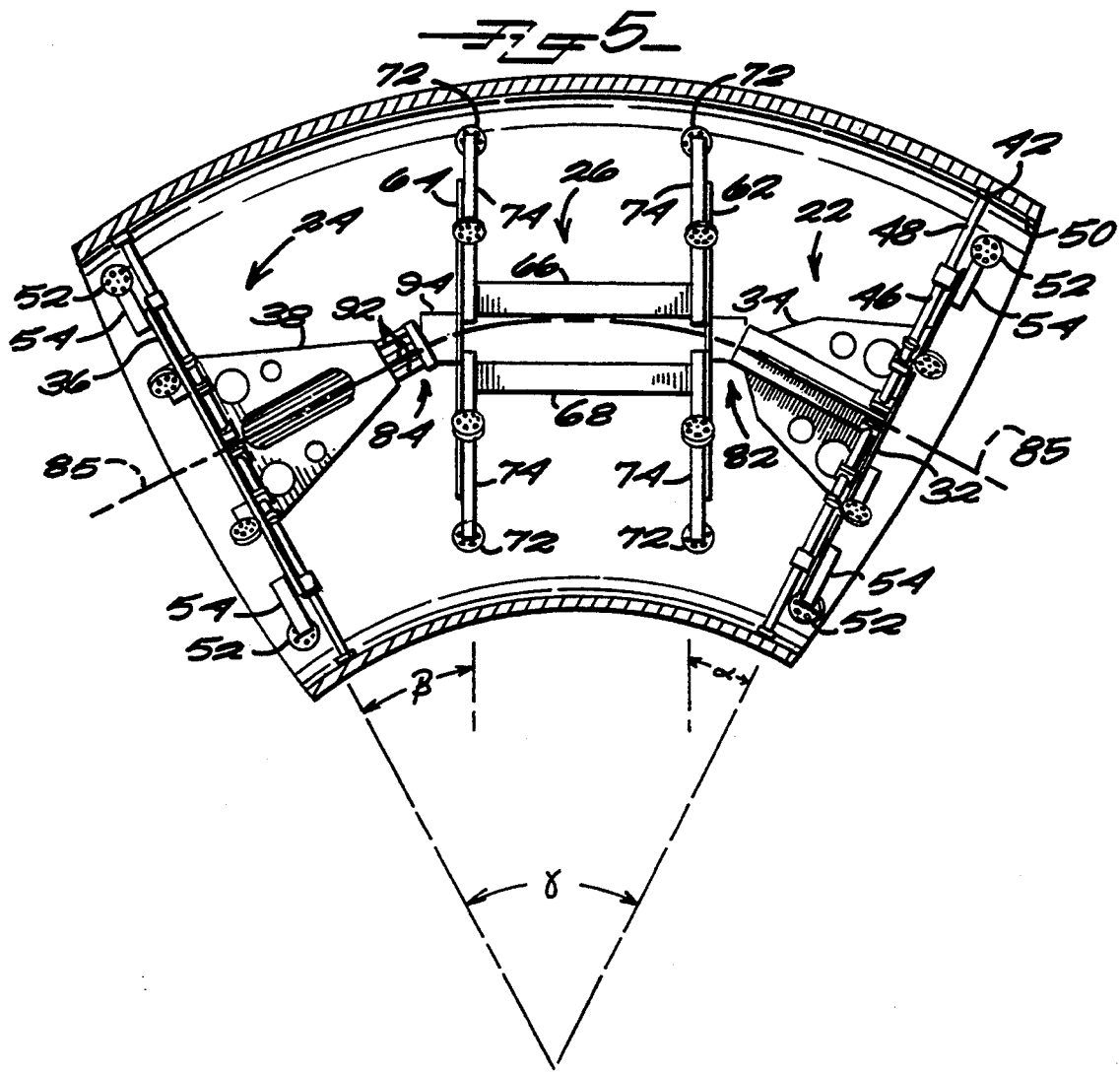

PIPE CRAWLER WITH STABILIZING MIDSECTION

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to devices for crawling through pipes. More particularly, the present invention relates to a pipe crawler having a midsection that provides both the stability and the flexibility necessary to efficiently negotiate bends in piping systems.

2. Discussion of Background

Many vehicles are known for moving through piping systems, including vehicles that carry inspection equipment and vehicles push or pull inspection equipment carried by a separate vehicle. Vehicles that are self-propelled are sometimes called pipe crawlers. The inspection equipment is used to assist in determining the structural integrity of piping that is otherwise difficult or impossible to inspect from the outside, such as underground piping or piping in hazardous or less than desirable locations. Due to the difficulty of moving through non-linear or uneven segments of piping, numerous pipe crawlers and associated equipment have been developed. See for example, U.S. Pat. Nos. 5,121,694 and 5,018,451.

Pipe crawlers are usually comprised of a front leg assembly, a rear leg assembly and, optionally, at least one intermediate body therebetween for moving one leg assembly with respect to the other in "inch worm" fashion. In these pipe crawlers, the intermediate body is configured with means for increasing and decreasing the distance between the front and rear leg assemblies so that, when the legs of one assembly are holding the crawler in engagement with the interior surface of the pipe, the legs of the other assembly can be retracted and moved forward. Then the legs of the second assembly hold the crawler while the first assembly moves forward. This series of motions is repeated so that the pipe crawler progresses through the piping.

Pipe crawlers exist that have a single intermediate body or midsection for connecting front and rear assemblies. For example, see U.S. Pat. No. 4,460,920, issued to Weber et al, U.S. Pat. No. 5,142,989, issued to Suzumori et al and U.S. Pat. No. 5,195,392, issued to Moore et al. In U.S. Pat. No. 5,172,639, Wiesman et al disclose a pipe traveler using a series of center bodies to connect a pair of carriages. Also, see co-pending application Ser. No. 08/064,880, now U.S. Pat. No. 5,309,844, commonly assigned, which features a pipe crawler combining a flexible joint and spring suspension system for connecting front and rear assemblies.

In U.S. Pat. No. 4,369,713, Richardson discloses a pipeline crawler with a power unit, a drive unit and a service or inspection unit connected by universal joints. The intermediate drive unit has wheel means that fold outwardly to engage the pipeline.

In U.S. Pat. No. 4,131,018, Müller et al describe a manipulator assembly for pipe testing that has a first vehicular member, a test system carrier member and a midsection positioned therebetween. The midsection has universal joints at each end for connecting each vehicular member to each other or to the test system carrier member. The midsection also has radially extending and retractable support legs with wheels.

Although numerous pipe crawlers exist, there is a need for a pipe crawler that has sufficient flexibility for negotiating curved and uneven portions of piping and yet provides the stability necessary to maintain the proper spatial positioning of the pipe crawler within the piping.

SUMMARY OF THE INVENTION

According to its major aspects and broadly stated, the present invention is a pipe crawler for moving through piping systems. In particular, it is a pipe crawler having a midsection that provides the stability and flexibility to allow the pipe crawler to negotiate curved and uneven segments of piping. The pipe crawler comprises a front leg assembly, a rear leg assembly, a midsection with a first flexible joint for connecting the midsection to the front leg assembly and a second flexible joint for connecting the midsection to the rear leg assembly, and means for changing the distance between the front and rear leg assemblies. The midsection has a plurality of legs extending radially therefrom for preventing the flexible joints from pivoting beyond their maximum displacement so that the joints do not lock up. The changing means, preferably carried by the rear leg assembly, extends and retracts to increase and decrease, respectively, the distance between the front and rear assemblies, both of which have radially extendible legs with foot pads for engaging the interior surface of the piping. The changing means cooperate with the alternating engagement of the interior surface of the piping by the radially extendible legs on the front and rear leg assemblies to move the pipe crawler through the piping in an "inchworm" manner through curved and uneven piping segments.

The use of two flexible connections, gimbals in particular, is a major feature of the present invention. The twin connections provide significant flexibility in negotiating curved and uneven piping. Furthermore, using two connections means that the angle between the planes defined by the front and rear leg assemblies can be divided between the two connections.

Another major feature of the present invention is the centering means between leg assemblies. The centering means limit the displacement of the flexible connections from the axis of the pipe. Excessive displacement of the flexible connection can cause it to become misaligned to the point where they are stuck, similar to a tractor trailer "jack-knifing." Limiting that displacement is important in keeping the pipe crawler able to move through the pipe.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 4 is a side view of the pipe crawling device showing the front assembly engaging the interior of the piping; and FIG. 5 is a side view of the pipe crawling device showing the front and rear assemblies engaging the interior of the piping.

DETAILED DESCRIPTION OF A PREFERRED EMBODIMENT

Figure 1:
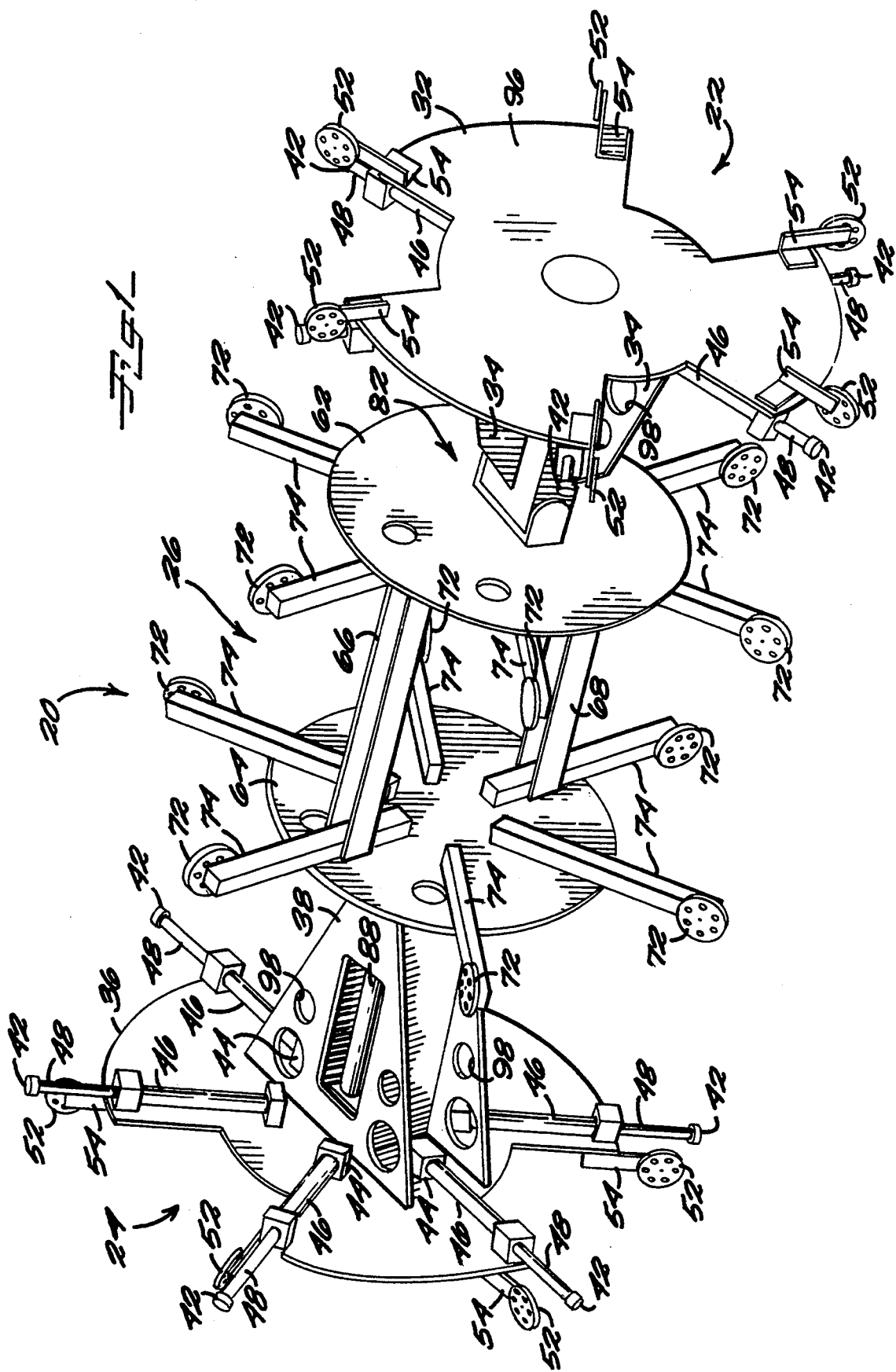
FIG. 1 is a perspective view of a pipe crawling device according to a preferred embodiment of the present invention.

In the following description similar components are referred to by the same reference numeral in order to simplify the understanding of the sequential aspect of the drawings.

Figure 2:
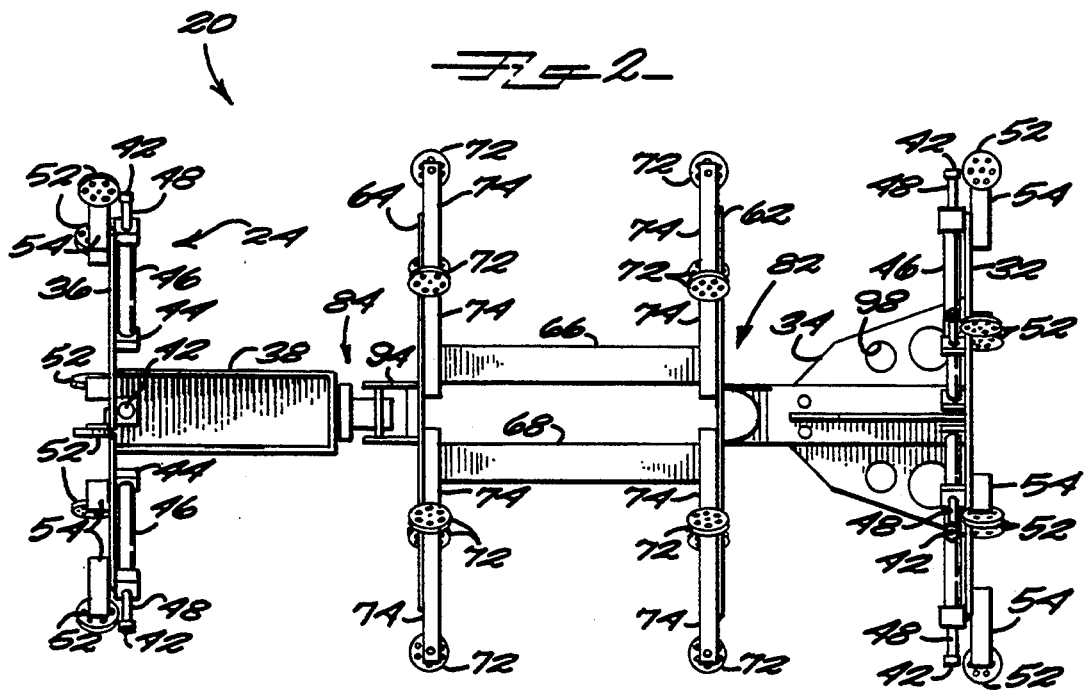
FIG. 2 is a side view of the pipe crawling device of FIG. 1 during complete retraction of the midsection from the rear assembly.
Figure 3:
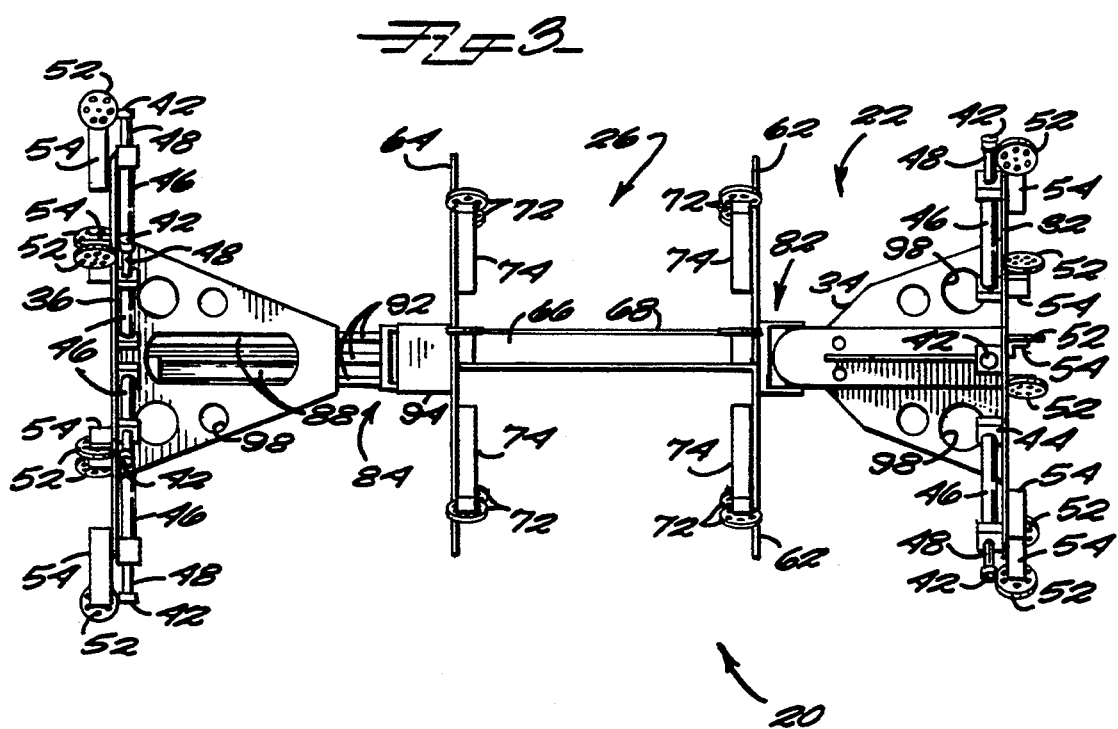
FIG. 3 is a top view of the pipe crawling device of FIG. 1 during partial extension of the midsection from the rear assembly.

Referring now to FIGS. 1-3, the pipe crawler 20 in its preferred embodiment has a front leg assembly 22, a rear leg assembly 24 and a midsection 26. Front leg assembly 22 is generally comprised of a front plate 32 and a front frame 34. Front plate 32 is a planar member, preferably round or octagonal in configuration, and dimensioned to fit easily in pipes of different diameters. Front frame 34 attaches to and extends axially inward frown front plate 32 toward midsection 26. Both front plate 32 and front frame 34 are preferably made of a strong but lightweight material, such as aluminum.

Rear leg assembly 24 is generally comprised of a rear plate 36 and a rear frame 38. Like front plate 32, rear plate 36 is a planar member, preferably round or octagonal in configuration, and dimensioned to fit easily in pipes of different diameters. Rear frame 38 is attached and extends axially inward from rear plate 36 toward midsection 26. Both rear plate 36 and rear frame 38 are preferably made of a strong but lightweight material, such as aluminum.

Front plate 32 and rear plate 36 both have a plurality of foot pads 42 mounted thereon for radial deployment. Each pad of foot pads 42 is moved radially between an extended position and a retracted position by an actuator 44, which preferably actuates an air cylinder 46 having a ram 48 slidably positioned therein. When actuator 44 moves ram 48 in the extended position, as shown on rear leg assembly 24 in FIGS. 1 and 4, and on front and rear leg assemblies 22, 24 in FIG. 5, rams 48 are extended radially outward from air cylinders 46 so that pads 42 engage the inner wall of a piping segment 50 (see FIGS. 4-5).

Adjacent to each pad of foot pads 42 is a first wheel 52 having a mount 54. Each mount 54, which is configured similar to an angle iron, fixably positions its corresponding wheel 52 so that the axis of rotation of wheel 52 is perpendicular to the axes of front and rear plates 32, 36 and the direction of movement of pipe crawler 20. When activator 44 moves ram 48 in the retracted position, as shown in FIGS. 2 and 3, rams 48 are retracted within air cylinders 46 so that pads 42 are radially inside a circular boundary defined by a radius extending from the axis of pipe crawler 20 to the outermost portion of wheels 52. Thus, wheels 52 are free to rotate thereby moving pipe crawler 20 forward along the interior of piping 50.

When rams 48 are in the extended position, as shown on both front and rear leg assemblies 22, 24 in FIG. 5, rams 48 are extended from air cylinders 46 so that pads 42 are radially beyond the circular boundary defined by the outermost portion of wheels 52, as just discussed. Thus, pads 42 engage the interior of piping 50, preventing corresponding wheels 52 from rotating to allow pipe crawler 20 to move along the interior of piping 50.

Midsection 26 preferably comprises a first plate 62, a second plate 64 and a pair of slats 66 for keeping first and second plates 62, 64 in constant spatial relation with respect to one another. Preferably, both first and second plates 62, 64 are planar members that are round or similarly shaped. Like front and rear plates 32, 36, first and second plates 62, 64 are made of a strong but lightweight material such as aluminum and the like.

Each of first and second plates 62, 64 of midsection 26 has a plurality of second wheels 72 radially disposed a fixed distance about the axes of first and second plates 62, 64 by a corresponding plurality of wheel posts 74 fixably attached to first and second plates 62, 64. Second wheels 72 are preferably made of stainless steel and are bolted to wheel posts 74 using conventional means, but most preferably using a shoulder screw, nut and bushing for smooth rolling.

Each post 74 has a fixed length and is preferably made of a strong but lightweight material such as aluminum and the like. As shown, each post 74 is fixably attached to first and second plates 62, 64 so that a portion of post 74 extends radially beyond first and second plates 62, 64. Alternatively, posts 74 may be radially extendible.

Preferably, a pair of slats 66, 68 is fixably connected between first and second plates 62, 64, as shown, to maintain the spacing therebetween. Preferably, slats 66, 68 are a pair of fixed-length, generally rectangular beams made of a strong but lightweight material such as aluminum. Slats 66, 68 can comprise any number of members capable of maintaining the spacing between first and second plates 62, 64 without sacrificing the sturdiness that slats 66, 68 provide.

A first joint 82 flexibly connects first plate 62 and front frame 34. Preferably, first joint 82 is a gimbal rotatable about two axes, thus allowing the planes of front leg assembly 22 and first plate 62 to pivot and rotate both vertically and horizontally with respect to each other as pipe crawler 20 moves into vertical and horizontal bends in piping 50. Alternatively, first joint 82 can be any joint that provides the requisite flexibility coupled with sufficient stability for proper operation, such as a ball joint and other suitable connectors.

Second plate 64 and rear frame 38 are flexibly connected by a second joint 84 and means for changing the distance between rear leg assembly 24 and midsection 26. Similar to first joint 82, second joint 84 is preferably a gimbal rotatable about two axes, thus allowing the planes of second plate 64 and rear leg assembly 24 to pivot and rotate both vertically and horizontally with respect to each other as pipe crawler 20 moves into vertical and horizontal bends in piping 50. Like first joint 82, second joint 84 can be any suitable connector, such as a ball joint and the like, that provides the necessary flexibility coupled with sufficient stability for pipe crawler 20 to operate properly.

As shown in FIG. 4, first and second joints 82, 84 on midsection 26 allow front and rear assemblies 22, 24 to pivot independently with respect to one another while pipe crawler 20 moves through piping 50. Also, posts 74 are dimensioned on midsection 26 so that wheels 72 keep first and second joints 82, 84 from rotating beyond their respective maximum displacements during movement of pipe crawler 20 through piping 50. That is, having midsection 26 with flexible connections on either side for connecting front leg assembly 22 and rear leg assembly 24 forces first and second joints 82, 84 to remain generally centered about an axis 85 in piping 50 so that neither first joint 82 nor second joint 84 rotates beyond its maximum permitted displacement.

With pipe crawler 20, displacement is the degree of rotation of front and rear joints 82, 84 as defined by the angle formed by front and rear leg assemblies 22, 24 with respect to front and rear plates 62, 64, respectively. As shown in FIG. 5, an angle $\alpha$ is formed by front plate 32 with respect to first plate 62 as a result of rotation by first joint 82. Similarly, an angle $\beta$ is formed by rear plate 36 with respect to second plate 64 as a result of rotation by second joint 84.

Maximum displacement is the degree of rotation of first or second joints 82, 84 without the possibility of locking up or seizing. In other words, if either of first or second joints 82, 84 is rotated beyond maximum displacement, the joint may not return to its normal operating position or retain its former rotating ability. As a result, pipe crawler 20 would, in all likelihood, be unable to move through curved portions of piping 50.

By using two flexible joints 82, 84 between front and rear leg assemblies 22, 24, rather than a single flexible joint, pipe crawler 20 divides the angle $\gamma$ formed by front and rear leg assemblies 22, 24 into angles $\alpha$ and $\beta$. Thus, front and rear leg assemblies 22, 24 can be rotated with respect to one another to a much greater degree without fear of pipe crawler 20 becoming disabled due to misalignment. The increased flexibility afforded by first and second joints 82, 84 allows pipe crawler 20 to negotiate curved portions of piping 50 with less difficulty and, to a certain extent, to negotiate more severe curves within piping 50.

As shown best in FIG. 3, the changing means preferably comprises at least one or more air cylinders 88 mounted within rear frame 38. Each air cylinder 88 slidably carries a retractable ram 92 that connects to one end of second joint 84. The other end of second joint 84 is connected to a mounting block 94 that is fixably attached to second plate 64. Rear frame 38 is preferably dimensioned to accommodate air cylinders 88. In operation, air cylinders 88 extend rams 92 to increase the distance between rear frame 38 and second plate 64 of midsection 26 (as shown in FIG. 3), and retract rams 92 to decrease the distance between rear frame 38 and second plate 64 of midsection 26 (as shown in FIG. 2).

Pipe crawler 20 is adapted for carrying equipment necessary for operation, namely hoses and valve systems for air cylinders 46, 88. Also, pipe crawler 20 is adapted for mounting other equipment for use within a piping system, such as inspecting, measuring and other testing equipment. Preferably, such equipment is mounted on an outer face 96 (see FIG. 1) of front plate 32, with equipment wiring and the like mounted on or passing through openings 98 formed in front and rear frames 34, 38.

In use, pipe crawler 20 is outfitted with the appropriate equipment, as discussed above, and is positioned within a piping system. Preferably, the piping system has a diameter no larger than the diameter of pipe crawler 20 when foot pads 42 are extended (preferably, approximately 36") and has elbows of no more than 90°.

Once positioned inside of the piping system, pipe crawler 20 begins moving through linear and curved segments of piping 50 in the previously discussed "inchworm" manner. The movement is typified by the following sequence: (a) air cylinders 46 located on rear leg assembly 24 are extended so that foot pads 42 extending from rear leg assembly 24 firmly engage the inner wall of piping 50; (b) air cylinders 46 located on front leg assembly 22 are retracted so that wheels 52 mounted on front leg assembly 22 are free to travel along the interior surface of piping 50 (steps a and b are shown generally in FIG. 4); (c) air cylinders 88 are extended, thereby increasing the distance between rear leg assembly 24 and midsection 26 so that midsection 26 and front leg assembly 22 moves forward along the interior surface of piping 50; (d) once air cylinders 88 have been extended the desired amount, air cylinders 46 located on front leg assembly 22 are extended radially so that pads 42 extending from front leg assembly 22 firmly engage the interior surface of piping 50; (e) air cylinders 46 located on rear leg assembly 24 are retracted so that wheels 52 mounted on rear leg assembly 24 are free to travel along the interior surface of piping 50; and (f) air cylinders 88 are retracted thereby decreasing the distance between midsection 26 and rear leg assembly 24 as rear leg assembly 24 moves forward along the interior surface of piping 50.

The steps mentioned above are repeated until pipe crawler 20 reaches its desired location within piping 50. During occasions when pipe crawler 20 must travel through curved segments of piping 50, first and second joints 82, 84 allow front leg assembly 22 and then midsection 26 to remain generally perpendicular to the axis of piping 50 while traveling through the "bend", thus preventing pads 42 extending from rear leg assembly 24 from slipping or lifting off of the interior of piping 50. Similarly, once front leg assembly 22 has passed through a curved segment of piping 50, pads 42 extending from front leg assembly 22 engage the interior surface of piping 50 while midsection 26 keeps second joint 84 near axis 85 of piping 50 so that rear leg assembly 24 is "pulled" through the bend by the retraction of air cylinders 88.

As discussed previously, posts 74 and wheels 72 mounted on midsection 26 prevent first and second joints 82, 84 from rotating beyond their maximum displacement as front leg assembly 22, midsection 26 and then rear leg assembly 24 move through the curved portion of piping 50. Thus, first and second joints 82, 84 do not become temporarily misaligned or off-centered, rendering pipe crawler 20 in operable.

The "inchworm" movement by pipe crawler 20 is continued through piping 50, through both linear, curved and uneven segments, until pipe crawler 20 reaches the desired location within the piping system.

It will be apparent to those skilled in the art that many changes and substitutions can be made to the preferred embodiment herein described without departing from the spirit and scope of the present invention as defined by the appended claims.

What is claimed is:

1. A pipe crawler for moving through piping, said piping having an interior and an axis, said pipe crawler comprising:
   a front leg assembly;
   first means for engaging said interior of said piping, said first engaging means carried by said front leg assembly, said first engaging means having an extended position and a retracted position, said first engaging means engaging said interior when in said extended position and not engaging said interior when in said retracted position;
   a rear leg assembly spaced apart from said front leg assembly;

second means for engaging said interior of said piping, said second engaging means carried by said rear leg assembly, said second engaging means having an extended position and a retracted position, said second engaging means engaging said interior when in said extended position and not engaging said interior when in said retracted position;

a midsection connected to said front leg assembly and said rear leg assembly;

a plurality of posts extending generally radially from said midsection, each post of said plurality of posts having a proximal end attached to said midsection and a distal end extending toward said interior of said piping, said posts holding said midsection within a radial distance from said axis of said piping; and means in operative connection with said front and rear leg assemblies liar moving said front and rear leg assemblies between a first position wherein said front and rear leg assemblies are closer together, and a second position wherein said front and rear leg assemblies are farther apart; and means for controlling said first and second extending means and said moving means so that said first extending means can move alternatingly between said extended position and said retracted position as said second extending means moves alternatingly between said retracted position and said extended position, respectively, and said moving means moves to said first position when said first extending means is in said extended position and to said second position when said second extending means is in said retracted position so that said pipe crawler crawls through said piping.

2. The pipe crawler as recited in claim 1, wherein said midsection has a first end and a second end and wherein said midsection further comprises:

first means for flexibly connecting said first end of said midsection to said front leg assembly, said first connecting means carried by said first end; and second means for flexibly connecting said second end of said midsection to said rear leg assembly, said second connecting means carried by said second end.

3. The pipe crawler as recited in claim 1, wherein said midsection has a first end and a second end and wherein said midsection further comprises:

a first gimbal for connecting said first end of said midsection to said front leg assembly, said first gimbal carried by said first end: and a second gimbal for connecting said second end of said midsection to said rear leg assembly, said second gimbal carried by said second end.

4. The pipe crawler as recited in claim 1, further comprising means carried by said distal end of said each post for rolling against said interior when said midsection reaches said radial distance.

5. The pipe crawler as recited in claim 1, wherein said midsection further comprises:

a first plate defining a first plane;

a second plate spaced apart from said first plate and defining a second plane;

means mounted between said first and second plates for connecting said first and second plates so that said first and second plates are generally parallel with respect to each other;

a first gimbal carried by said first plate and attached to said first leg assembly; and a second gimbal carried by said second plate and attached to said second leg assembly.

6. The pipe crawler as recited in claim 1, wherein said moving means further comprises at least one air cylinder having a ram slidably carried by said air cylinder, said ram extending from said air cylinder when said air cylinder is actuated and retracting into said air cylinder when said air cylinder is not actuated, said air cylinder moving said front and rear leg assemblies to said second position when said air cylinder is actuated and to said first position when said air cylinder is not actuated.

7. The pipe crawler as recited in claim 1, wherein said front leg assembly and said rear leg assembly each further comprises:

a frame;

a plurality of actuators carried by said frame a plurality of feet carried by said plurality of actuators, each foot of said plurality of feet carried by one actuator of said plurality of actuators, said one actuator deploying said each foot radially with respect to said axis between said extended and said retracted positions.

8. The pipe crawler as recited in claim 1, wherein each post of said plurality of posts is radially extendible.

9. A pipe crawler for moving through piping, said piping having an interior and an axis, said pipe crawler comprising:

a front leg assembly;

first means for engaging said interior of said piping, said first engaging means carried by said front leg assembly, said first engaging means having an extended position and a retracted position, said first engaging means engaging said interior when in said extended position and not engaging said interior when in said retracted position;

a rear leg assembly spaced apart from said front leg assembly;

second means for engaging said interior of said piping, said second engaging means carried by said rear leg assembly, said second engaging means having an extended position and a retracted position, said second engaging means engaging said interior when in said extended position and not engaging said interior when in said retracted position;

a midsection connected to said front leg assembly and said rear leg assembly and having a first gimbal attached to said front leg assembly, and a second gimbal attached to said second leg assembly;

a plurality of posts extending radially from said midsection toward said piping, said posts holding said midsection within a radial distance from said axis of said piping; and means attached to said rear leg assembly for moving said front and rear leg assemblies between a first position wherein said front and rear leg assemblies are closer together, and a second position wherein said front and rear leg assemblies are farther apart; and means for controlling said first and second extending means and said moving means so that said first extending means can move alternatingly between said extended position and said retracted position as said second extending means moves alternatingly between said retracted position and said extended position, respectively, and said moving means moves to said first position when said first extending means is in said extended position and to said second position when said first extending means is in said retracted position so that said pipe crawler crawls through said piping.

10. The pipe crawler as recited in claim 9, wherein said midsection has a front end toward said front leg assembly and a rear end toward said rear leg assembly, and wherein said plurality of posts further comprises:
a first plurality of posts carried by said front end; and
a second plurality of posts carried by said rear end.

11. The pipe crawler as recited in claim 9, wherein each post of said plurality of posts has a proximal end attached to said midsection and a distal end extending toward said interior of said piping, further comprising
means carried by said distal end of said each post for rolling against said interior when said midsection reaches said radial distance.

12. The pipe crawler as recited in claim 9, wherein said midsection has a front end toward said front leg assembly and a rear end toward said rear leg assembly, and wherein said plurality of posts further comprises:
a first plurality of posts carried by said front end;
a first set of wheels, each wheel of said first set of wheels rotatably carried by one post of said first plurality of posts;
a second plurality of posts carried by said rear end; and
a second set of wheels, each wheel of said second set of wheels rotatably carried by one post of said second plurality of posts.

13. The pipe crawler as recited in claim 9, wherein said midsection has
a front end and an opposing rear end,
a first plate attached to said front end and defining a first plane,
a second plate attached to said rear end and defining a second plane, and
at least two slats fixably mounted between said first and second plates for connecting said first and second plates so that said first and second plates are generally parallel with respect to each other, and said plurality of posts has
a first plurality of posts carried by said front end,
a first set of wheels, each wheel of said first set of wheels rotatably carried by one post of said first plurality of posts,
a second plurality of posts carried by said rear end, and
a second set of wheels, each wheel of said second set of wheels rotatably carried by one post of said second plurality of posts.

14. The pipe crawler as recited in claim 9, wherein each post of said plurality of posts is radially extendible.

15. A pipe crawler for moving through piping, said piping having an interior and an axis, said pipe crawler comprising:
a front leg assembly;
first means for engaging said interior of said piping, said first engaging means carried by said front leg assembly, said first engaging means having an extended position and a retracted position, said first engaging means engaging said interior when in said extended position and not engaging said interior when in said retracted position;
a rear leg assembly spaced apart from said front leg assembly;
second means for engaging said interior of said piping, said second engaging means carried by said rear leg assembly, said second engaging means having an extended position and a retracted position, said second engaging means engaging said interior when in said extended position and not engaging said interior when in said retracted position;
a midsection connected to said front leg assembly and said rear leg assembly and having
a front end and an opposing rear end,
a first means for flexibly connecting said front leg assembly to said front end of said midsection, and
a second means for flexibly connecting said second leg assembly to said rear end of said midsection;
a plurality of posts extending radially from said midsection toward said interior of said piping but spaced apart from said interior when said midsection is coaxial with said piping, said plurality of posts holding said midsection within a radial distance from said axis of said piping; and
means attached to said rear leg assembly for moving said front and rear leg assemblies between a first position wherein said front and rear leg assemblies are closer together, and a second position wherein said front and rear leg assemblies are farther apart; and
means for controlling said first and second extending means and said moving means so that said first extending means can move alternatingly between said extended position and said retracted position as said second extending means moves alternatingly between said retracted position and said extended position, respectively, and said moving means moves to said first position when said first extending means is in said extended position and to said second position when said first extending means is in said retracted position so that said pipe crawler crawls through said piping.

16. The pipe crawler as recited in claim 15, wherein each post of said plurality of post carries means for rolling along said interior of said piping.

17. The pipe crawler as recited in claim 15, wherein said plurality of posts further comprises a first set of posts carried by said front end of said midsection and a second set of posts carried by said rear end of said midsection.

18. The pipe crawler as recited in claim 15, wherein said plurality of posts further comprises a first set of posts carried by said front end of said midsection and a second set of posts carried by said rear end of said midsection, and said each post of said plurality of posts carries a wheel for engaging said interior of said piping.

19. The pipe crawler as recited in claim 15, wherein said first connecting means is a first gimbal and said second connecting means is a second gimbal.

20. The pipe crawler as recited in claim 15, wherein each post of said plurality of posts is radially extendible.

* * * * *